United States Patent [19]
Barry et al.

[11] 3,829,816
[45] Aug. 13, 1974

[54] COUPLING ASSEMBLY

[75] Inventors: Adelbert Barry; Karl O. Heintz, both of Houston, Tex.

[73] Assignee: Esso Production Research Company, Houston, Tex.

[22] Filed: Aug. 21, 1972

[21] Appl. No.: 282,892

[52] U.S. Cl. ............... 339/16 R, 151/25 B, 285/414
[51] Int. Cl. ............................................. H01r 3/04
[58] Field of Search ................. 339/15, 16 R, 16 C; 285/81, 82, 84, 86, 414, 415, 417, DIG.14; 151/19 A, 25 B

[56]  References Cited
UNITED STATES PATENTS

| | | | |
|---|---|---|---|
| 1,093,666 | 4/1914 | Wegener | 151/25 B |
| 2,026,674 | 1/1936 | Edwards | 285/20 |
| 2,531,120 | 11/1950 | Feaster | 339/16 R X |
| 2,660,212 | 11/1953 | Allen | 151/25 B |
| 3,201,149 | 8/1965 | Bragg | 285/39 |
| 3,623,753 | 11/1971 | Henry | 285/330 |
| 3,649,949 | 3/1972 | McCarthy et al. | 339/16 R |

*Primary Examiner*—Bobby R. Gay
*Assistant Examiner*—Robert A. Hafer
*Attorney, Agent, or Firm*—Robert L. Graham

[57]  ABSTRACT

An improved coupling assembly for joining a pair of pipe sections includes a pin member connected to one of the pipe sections, a box member connected to the other of the pipe sections, and a collar mounted on one of the members and adapted to be threadedly connected to the other member. The assembly also includes a one-way clutch which permits the collar to be rotated in one direction but not the opposite direction. The improved coupling assembly includes a plug-type connector which is adapted to provide an electric circuit across the joint of the connected members.

4 Claims, 10 Drawing Figures

COUPLING ASSEMBLY

BACKGROUND OF THE INVENTION

1. Field of the Invention

This invention relates to drill pipe used in rotary drilling operations. In one aspect, it relates to an improved coupling assembly for interconnecting drill pipe sections. In another aspect, the invention relates to drill pipe provided with electrical conductor means.

2. Description of the Prior Art

In conventional rotary drilling operations, torque is transmitted to the drill bit through a long, tubular column referred to as the drill string. The drill string includes individual lengths of drill pipe connected together by tool joints. The typical tool joint consists of a box member provided with internal threads and a pin member provided with external threads. These members are normally attached to opposite ends of a tubular portion of each pipe section by welded connections. The pipe sections are joined together by screwing the pin member of one section into the box member of an adjacent section. The length of the individual pipe sections including the pin and box members is normally about 31 feet so that several of these sections are required in the drilling of deep wells.

Drilling operations employing conventional drill pipe can normally be performed only in one direction of rotation. If the threads of the tool joints are right-handed threads, drilling is performed by rotating the drill string clockwise. The application of torque in a clockwise direction to this string is normally avoided because of the danger of parting the pipe string. Similarly, tool joints provided with left-hand threads permit drilling in only counterclockwise direction of pipe rotation.

Under certain drilling conditions, however, it is desirable to reverse the direction of pipe rotation. For example, hole deviation can be sometimes corrected if the drilling operations are performed in the opposite direction of normal rotation. Also, in fishing operations, it sometimes is desirable to apply torque to the drill string in either clockwise or counterclockwise direction.

Tool joints which enable bidirection transmission of torque have been proposed. Such tool joints are normally constructed to provide intermeshing teeth or jaws for transmitting torque in either direction across the connection. In such designs, a collar is normally employed to maintain the intermeshing teeth or jaws in assembled relation. A problem associated with this design, however, has been the tendency of the collar to become loosened from vibration or from drag forces resulting from the collar engaging the borehole wall.

The improved tool joint constructed according to the present invention and described in detail below overcomes this problem by providing the tool joint assembly with a one-way clutch which functions to maintain the collar secure during drilling operations.

In the drilling of wells, it frequently is desirable to transmit an electrical signal between the surface and a subsurface location. One approach for providing an electric circuit between the surface and subsurface locations has been to mount a conductor in individual pipe sections and to provide an electric connector at the joint of the pipe sections. If conventional tool joints are employed, the connector must be designed in such a manner that electric contact is made at the threaded joint of the pin and box members. This design normally requires an electric connector comprising a pair of sliding contacts—one mounted on the pin member, and the other in the box member. The sliding contacts mate when the pin member is screwed into the box member. A problem associated with this design, however, has been the tendency of the sliding contacts to become worn or corroded from use. Also, the sliding contacts are difficult to insulate.

Since the failure of one electrical connection grounds or shorts out the entire circuit, it will be appreciated that the electrical connections between the pipe should possess a high degree of reliability. The tendency of the sliding contacts to become worn or corroded and the problem of insulating such contacts makes this design at best of questionable reliability.

The reliability of the electrical connections is particularly important in drill strings because of the inaccessibility of the connectors once the drill string is lowered into the borehole and placed in operation.

SUMMARY OF THE INVENTION

The present invention provides an improved coupling assembly that permits the drill pipe to be rotated in either clockwise or counterclockwise direction. It also provides an improved coupling assembly having electrical conductor means mounted therein.

Briefly, the improved coupling assembly comprises a box member, a pin member, and a collar for joining the two members together. The box and pin members have interlocking gripping jaws so that torque can be transmitted bidirectionally through the coupling assembly. The collar is mounted on one member, e.g. box member, and is adapted to be threaded to the other member, e.g. pin member. The collar is provided with a clutch means that permits the collar to rotate in one direction but not the opposite direction. Thus, the collar can be turned in a direction which permits the threads thereof to mate with the threads of the pin member. Once the collar is threadedly connected to the pin member, the clutch means prevents the collar from becoming loosened during drilling operations. The coupling assembly also includes means for releasing the clutch means to permit the collar to be disconnected from the pin and box members.

In another embodiment of the invention, the improved coupling assembly includes electrical contact means. This assembly, in addition to joining pipe sections together, functions to interconnect electric conductors mounted in the joined pipe sections. This embodiment is particularly useful in telemetry operations wherein an electrical signal indicative of a subsurface condition is transmitted from a subsurface location to a surface readout location. It may also be employed to transmit an electrical signal from the surface to a subsurface location to actuate a drilling tool or instrument.

Since the pin and box members of the coupling assembly are mated by relative linear movement rather than by relative rotary movement, the electric contact therebetween can be a plug-type connector. The electrical connection is provided by equipping either the pin or box members with a male pin contact and the other member with a companion female socket contact. As the pin member is directed linearly into engagement with the box member, the male and female contacts mate providing a positive electrical connection. The connector includes an insulation which completely surrounds the mated female and male contacts thereby providing a water-tight connection. The electric circuit between the surface and a subsurface location is provided by joining together a series of individual pipe sections—each containing an electric conductor—using coupling assemblies constructed according to the present invention.

DESCRIPTION OF THE PREFERRED EMBODIMENTS

Figure 1:
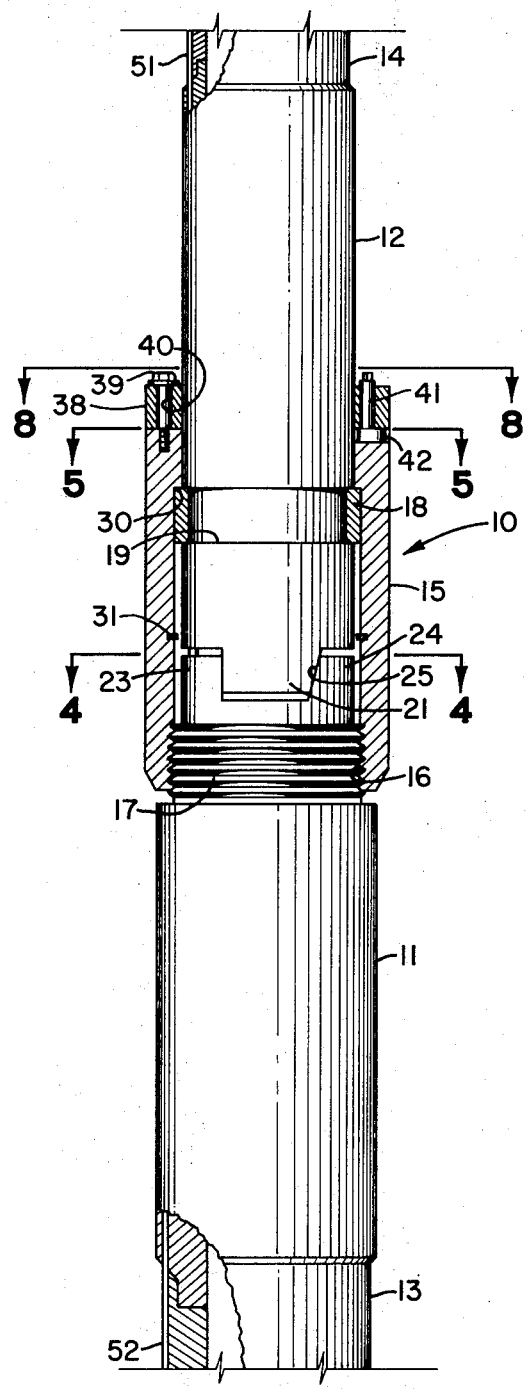
FIG. 1 is a longitudinal view, partially in section, of a coupling assembly constructed according to the present invention.

The drill string employed in rotary drilling operations is normally composed of several sections of drill pipe joined together in end-to-end relation by suitable coupling means. The coupling assembly of the present invention, indicated generally as 10 in FIG. 1, includes a pair of mated tool joints. One tool joint, which will be referred to as the pin member 11, is connected to pipe section 13 and the other, which will be referred to as the box member 12, is connected to pipe section 14. It will be understood that each pipe section of the drill string will have secured to its opposite ends a pin member 11 and a box member 12 similar to those depicted in FIG. 1. The pin and box members 11 and 12 may be connected to their associated pipe section 13 and 14 by a welded connection, or may be integrally formed therewith. The drill string, or at least a portion of the drill string, will consist of a plurality of pipe sections interconnected by the coupling assemblies 10. In a preferred embodiment of the invention, the box member 12 has mounted thereon a collar 15 provided with internal threads 16. The pin member 11 is provided with external threads 17 which mate with the threads 16 of collar 15. A suitable thread for this connection is an American Standard stub thread, although other thread forms may be used if desired.

The collar 15 is mounted on the box member 12 by means of a support ring 18 contained in a suitable circumferential groove 19 formed in the outer periphery of box member 12. The collar 15 is free to rotate relative to both the pin member 11 and box member 12, and is free to move axially relative to these two members. The collar 15 serves to maintain adjacent pipe sections in assembled condition, and in combination with ring 18 serves to carry tensile loads imparted on the drill string.

Figure 4:
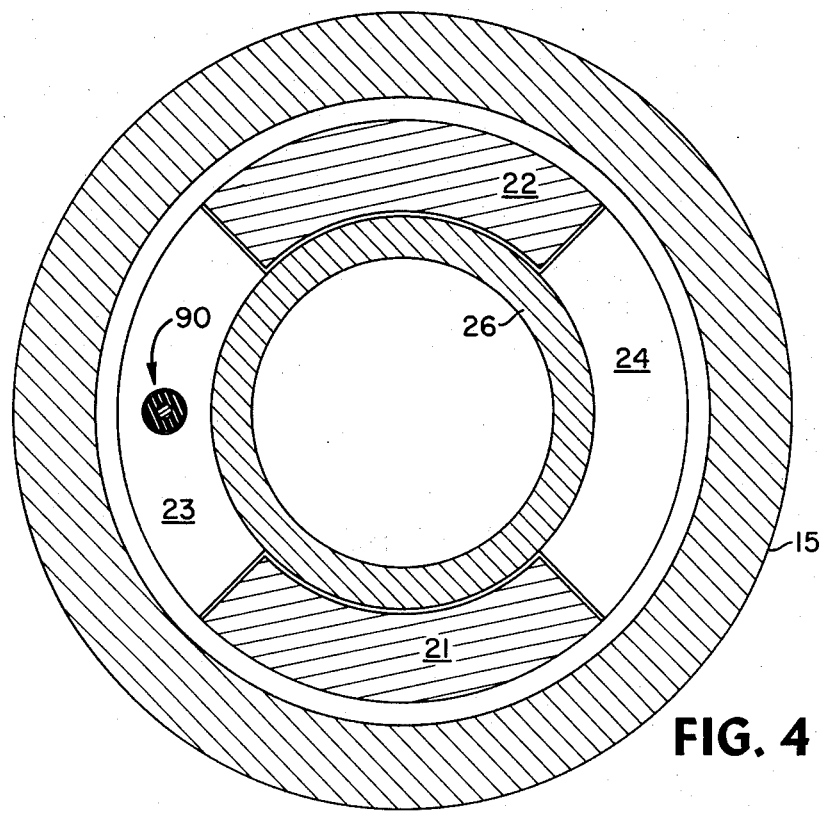
FIG. 4 is a cross sectional view of the assembly shown in FIG. 1 with the cutting plane taken generally along the line 4—4 thereof.

Torque is transmitted between the two pipe sections by means of interlocking lugs or gripping jaws which function much in the same manner as a jaw clutch. The box member 12 is provided with gripping jaws 21 and 22. Likewise, the pin member 11 is provided with gripping jaws 23 and 24. These jaws may be formed by cutting out end portions of each tool joint to form alternating and circumferentially spaced grooves and jaws. The grooves and jaws are dimensioned so that the jaws of one tool joint mate with the grooves of the other tool joint forming interlocking jaws (see FIG. 4). The mating edges as at 25 of jaw 21 and jaw 24 may be slanted with respect to the axis of the pipe. This insures that the jaws become securely lodged in their associated grooves and also compensates for wear. The angle defined by the mating edges 25 with respect to the axis of the pipe may vary between about 15 and 30°. The edges of the remaining jaws will normally extend axially with respect to the pipe. The dimensions of each jaw with respect to that of its mating groove are such that the jaw does not penetrate the groove to its full extent. A small space, in the order of about one-fourth inch, is left between the end of each jaw and the bottom of its associated groove. The number of jaws and companion grooves can be varied but normally from one to four jaws and grooves are sufficient. It should be noted that the gripping jaws may take other forms as, for example, axially extending splines or a sqaure pin and box construction.

Figures 2, 3:
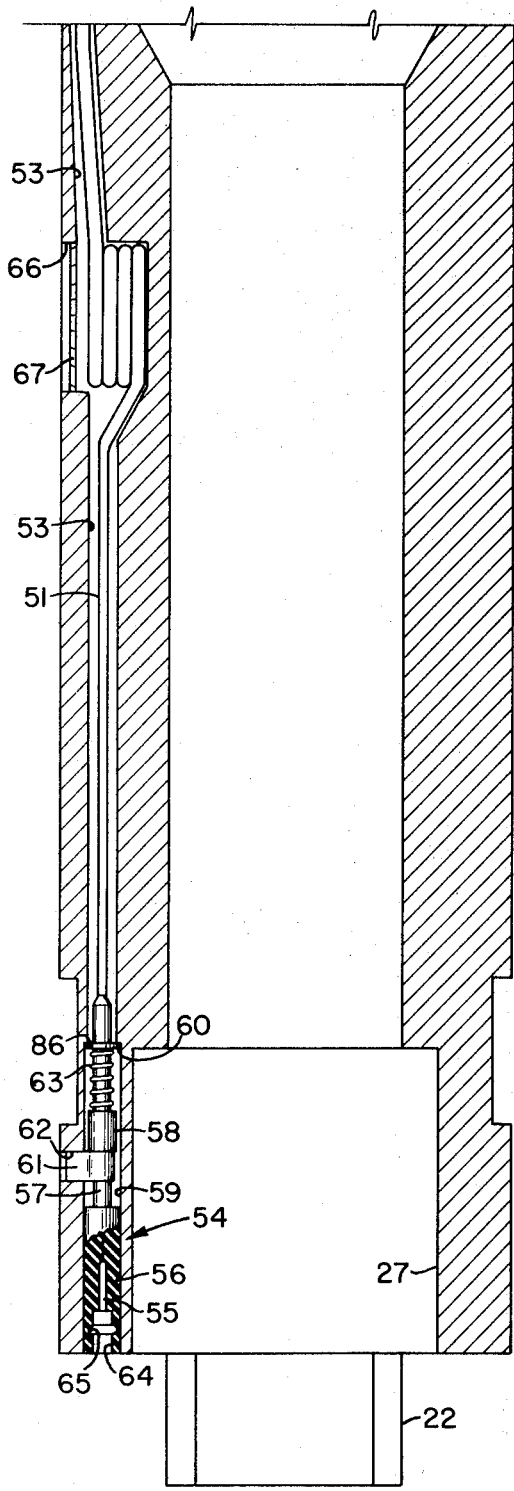
FIG. 2 is a longitudinal view of the box member shown in FIG. 1.
FIG. 3 is a longitudinal sectional view of the pin member shown in FIG. 1.

In order to provide a fluid-tight connection, one of the tool joints, preferably pin member 11, is provided with a pin 26 (see FIG. 3) sized to fit in close conformity with a complementary opening 27 formed in box member 12 (see FIG. 2). Referring to FIG. 3, the pin 26 has formed in its outer periphery a circumferentially extending groove 28 which receives an O-ring 29 or similar sealing element. Normally the pin member 11 will be disposed in the upper end of the pipe; the two pipe sections are joined by directing the box member 12 into mating relation with the pin member 11. The jaws 21 and 22 intermesh with jaws 23 and 24 and the 0-ring 29 seals the space between the outer periphery of pin 26 and the internal surface of opening 27. With the pin and box members mated in this manner, the collar 15 is then threadedly connected to the threads 17 of pin member 11.

As mentioned previously, the collar 15 is separate from either the pin and box members 11 and 12. The collar 15 is sized to slidingly fit about the outer periphery of the box member 12 and has formed therein internal shoulder as at 30 which is adapted to bear against support ring 18. The support ring 18 may be a split ring and may be installed by first positioning the collar 15 about the box member 12, sliding the collar 15 upwardly along box member 12, and inserting the split ring 18 into groove 19. The collar 15 is then lowered until shoulder 30 engages the upper edge of ring 18. A snap ring 31 contained in a suitable internal groove formed in a lower portion of collar 15 may be employed to retain the collar 15 about the lower end of box member 12. Thus, when the drill pipe is stacked on the drilling rig floor, the snap ring 31 engaging the lower edge of support ring 18 bears the weight of each stand of pipe.

Figure 5:
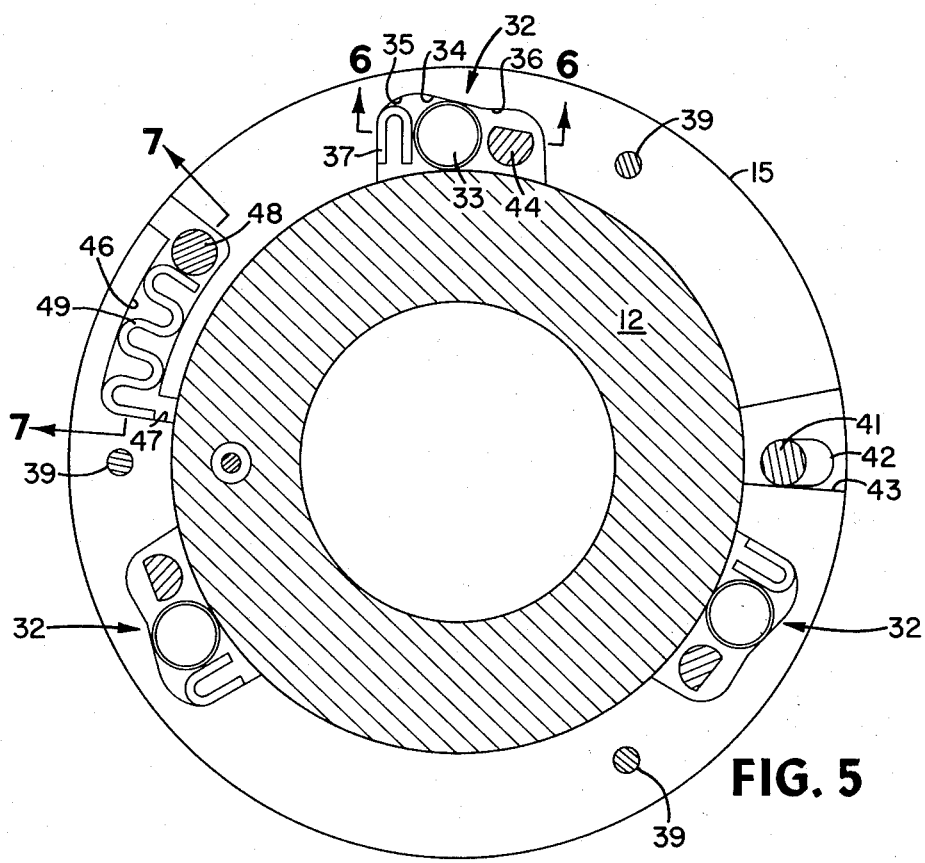
FIG. 5 is a cross sectional view of the assembly shown in FIG. 1 with the cutting plane taken generally along line 5—5 thereof.

The coupling assembly 10 described to this point is capable of supporting tensile and compressive loads imposed on the drill string and transmitting torque in either clockwise or counterclockwise direction. However, such a coupling would be difficult to maintain in assembled condition during drilling operation. The pipe vibration and drag forces resulting from the collars 15 engaging the bore wall as the drill string is rotated would tend to cause the collar 15 to unscrew from the threads of tool joint 12. In order to prevent the collar 15 from becoming loosened from these forces, the coupling assembly 10 of the present invention further includes a one-way clutch that permits the collar 15 to be turned relative to members 11 and 12 in one direction but not the opposite. The one-way clutch, indicated generally as 32 in FIG. 5, operates much in the manner of an overrunning clutch and comprises at least one roller 33 and a cam surface 34 formed in the collar 15. The cam surface 34 may be formed by cutting out an internal section of the upper edge of the collar 15 to provide an upwardly and inwardly opening recess. The recess is machined such to have a wide section as at 35 and a narrow section as at 36. The axially extending outer wall defining the recess is tapered and provides the cam surface 34. The roller 33 is sized to fit in the recess and has a length slightly less than the axial dimension of the recess and a diameter slightly less than the radial dimension of the enlarged section 35. With the collar 15 mounted on the box member 12, the roller 33 is inserted into the recess and a spring 37 is positioned between the roller 33 and an end wall of recess. The spring 37 urges the roller 33 into engagement with the cam surface 34 and the outer periphery of box member 12. A retainer ring 38 is then secured to the upper end of the collar 15 (see FIG. 1). The retainer ring 38 closes the recess and maintains the one-way clutch 32 in assembled condition. The one-way clutch 32, collar 15, and ring 38, conce installed on the box member 12 in the manner described above is permanent and will require disassemblage only for replacement of worn or damaged parts. Although only one of the roller and can assemblies are required, several can be employed, if desired. In FIG. 5, three of such assemblies are illustrated.

Operation of the one-way clutch can best be appreciated with reference to FIG. 5. Turning of the collar 15 in a clockwise direction forces the roller 33 against spring 37 and into the enlarged section 35 of the recess permitting collar 15 to be turned relative to box member 12. With the assembly in a static condition, however, the spring 37 forces the roller 33 to be wedged between the cam surface 34 and the outer periphery of box member 12. The one-way clutch 32 thus permits the collar 15 to be turned in a clockwise direction allowing the internal threads 16 thereof to mate with threads 17 of pin member 11. Once made up, however, the collar 15 cannot be turned in a counterclockwise direction because of the wedging of the roller 33 between the cam surface 34 and the box member 12. This is an important feature of the present invention because of the drag forces imparted on collar 15 during drilling operations. Consider for example a drill string being rotated in a clockwise direction as viewed in FIG. 5. A drill collar 15 (without the one-way clutch) engaging the bore wall would tend to be loosened since the drag forces imparted thereon would be in a counterclockwise direction. However, the one-way clutch 32, because of the holding force of the roller 33 wedging between the cam surface 34 and box member 12, prevents the collar 15 from turning in a counterclockwise direction. The on-way clutch 32 also prevents the collar 15 from becoming loose due to vibrations imparted on the drill string.

Figure 8:
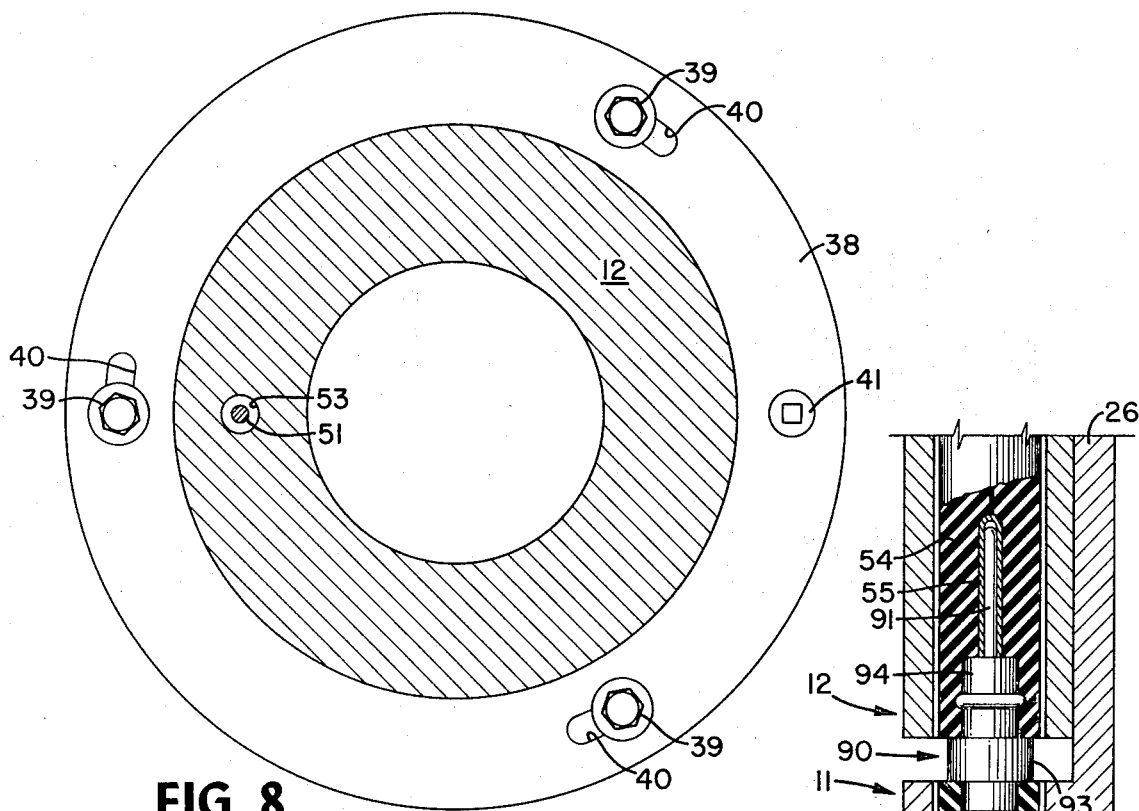
FIG. 8 is a cross sectional view of the assembly shown in FIG. 1 with the cutting plane taken generally along the line 8—8 thereof.

As mentioned above, the retainer ring 38 is secured to the upper end of the collar 15 and serves to close the recesses formed therein. The retainer ring 38 may be bolted to the collar 15 by means of a plurality of shoulder bolts illustrated as 39 in FIGS. 1 and 8. The bolts 39 extend through elongate slots 40 formed in the ring 38 and threadedly connect to the upper edge of collar 15.

Figure 6:
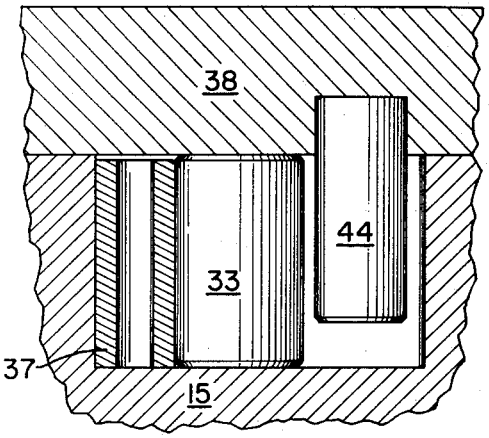
FIG. 6 is a sectional view of the one-way clutch assembly shown in FIG. 5 with the cutting plane taken through line 6—6 thereof.

The coupling assembly 10 also includes a clutch release mechanism which, when actuated, permits the collar 15 to be disconnected from the threaded end of pin member 11. As shown in FIGS. 1 and 5, a pin 41 extends through the ring 38 and is provided with a cam or lobe 42 positioned in a cutout section in the upper edge of collar 15. The cutout section has a radially extending wall 43 adapted to engage the lobe 42. The upper end of the pin 41 is provided with an exposed square head or similar structure sized to fit a wrench or lever. Thus as viewed in FIGS. 5 and 8, turning of the lobe 42 a quarter of a turn in clockwise direction causes the retainer ring 38 to move in a counterclockwise direction. The elongate slots 40 permit the bolts 39 and ring 38 to move a short distance relative to the collar 15. A pin 44 depending from the lower edge of the retainer ring 38 is positioned within the recess which contains the one-way clutch 32 (see FIGS. 5 and 6). As the ring 38 is moved counterclockwise as viewed in FIGS. 5 and 8, the pin 44 forces the roller 33 into the enlarged section 35 of the recess and thus releases the one-way clutch.

Figure 7:
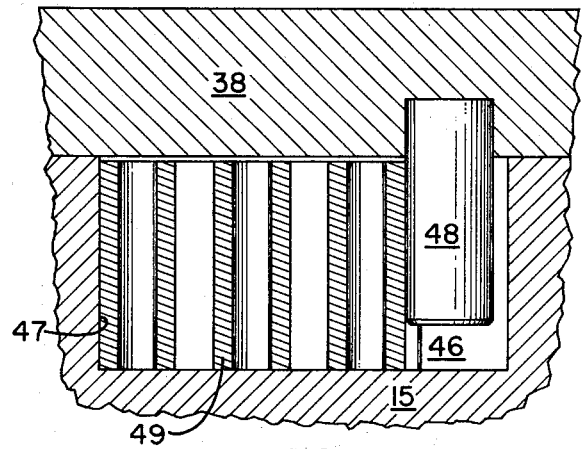
FIG. 7 is a sectional view of the clutch release mechanism shown in FIG. 5, the section being aken through line 7—7 thereof.

As shown in FIGS. 5 and 7, the upper end of the collar 15 is provided with a circumferentially extending groove 46 that is defined in part by an end surface 47. A pin 48 secured to and depending from the lower surface of the retainer ring 38 fits into the groove 46. A spring 49 interposed between surface 47 and pin 48, urges the ring 38 in a clockwise direction relative to the collar 15. The lobe 42 of pin 41 is thus maintained in abutting relation on surface 43. Counterclockwise movement of the ring 38 relative to collar 15, caused by turning the pin 41 and lobe 42 one-quarter turn, compresses the spring 49. The lobe 42 has an overcenter position such that it locks the ring 38 in the position which releases the one-way clutch 32 permitting the collar 15 to be turned in counterclockwise direction and unscrewed from pin member 11.

Individual pipe sections provided with the coupling assembly 10 of the present invention will normally be joined by the following procedure. A first pipe section with the pin member 11 disposed upwardly is suspended in the rig rotary table. The box member 12 of a second pipe section suspended on the rig elevator is directed onto the pin member 11 of the first pipe section. The pin 26 of member 11 enters opening 27 of member 12 and the jaws 21 and 22 mesh with jaws 23 and 24. with the clutch release mechanism placed in the released position, collar 15 is screwed onto the threads 17 of pin member 11. The clutch release mechanism is then actuated to the position which prevents the collar 15 from unscrewing. The pipe sections may be joined in this manner until the complete drill string is assembled.

Although the coupling assembly of the present invention can be used with advantage in drilling operations since it permits the drill string to be rotated in either a clockwise or counterclockwise direction, it also offers a convenient tool for assembling pipe sections containing electrical conductors. As described above, the tool joints being joined are first positioned relative to each other before the collar 15 is threadedly connected to one of the tool joints. Specifically, the box member 12 is moved rectilinearly and axially with respect to the pin member 11 until the gripping jaws mesh. This type of coupling permits the use of a plug-type connector to join the conductors provided in each of the pipe sections being joined.

As illustrated in FIG. 1, the pipe sections being joined are each provided with an insulated electric conductor. The conductor may be mounted in a suitable groove formed in the straight portion of pipe sections 13 and 14 and may extend through a suitable passage formed in each of the tool joints 11 and 12. In this manner, pipe section 13 is provided with an electric conductor 52 and pipe section 14 is provided with an electric conductor 51. The conductors 51 and 52 are each mounted in a longitudinally extending groove in the outer periphery of its associated pipe section. The conductors 51 and 52 may be cemented in the grooves with an epoxy resin or other adhesive. As illustrated in FIG. 2, conductor 51 extends through passage 53 formed in the box member 12 and has a lower terminal end 54 provided with a femal socket contact 55. The terminal end 54 may be molded of neoprene or similar insulating material to provide a tough, rigid construction. The terminal end 54 is molded to provide an end portion 56 which encases the femal contact 55, a neck portion 57, and an enlarged portion 58.

The passage 53 extends longitudinally through the wall of box member 12 and exits through a bottom surface of one of the grooves separating jaws 21 and 22. A lower portion of the passage 53 is counterbored as at 59 providing an internal shoulder at 60.

The terminal end 54 is held in place by a bifurcated clip 61 which is adapted to pass through a side opening 62 formed in the box member 12. The clip 61 straddles neck portion 57 of the terminal end 54. A compression spring 63 acting between the upper edge of enlarged portion 58 and internal shoulder 60 urges the lower edge of enlarged portion 58 into engagement with the clip 61. This maintains the inlet of the terminal end 54 about flush with the bottom of the groove separating the jaws 21 and 22. The female contact 55 comprises a socket embedded in molded insulating material. The contact 55 is spaced from the entrance of the terminal end 54 by a recess 64. An internal annular groove 65 is formed in the walls of the insulating material defining the recess.

An opening 66 formed in the wall of the box member 12 and intercepting the conductor passage 53 may be employed to store excess conductor if desired. The excess conductor is coiled and placed in the circular opening where it is held in place by a cap 67.

As mentioned previously, the lower section of the pipe assembly shown in FIG. 1 is provided with an insulated electrical conductor 52. The conductor 52 extends through a longitudinal passage 70 formed in the wall of tool joint 12. The passage 70 extends axially through one of the jaw 23 and exits through the top surface thereof. An upper portion of passage 70 is counterbored as at 72 and provides an internal shoulder therein at 73. The upper terminal end 74 of the socket contact 52 is connected to a female connector 75 and is molded to provide an end portion 76, a neck portion 77, and enlarged portion 78. The terminal end 74 is held in place by a clip 79 which passes through a suitable opening 80 formed in the pin member 11. A compression spring 81 interposed between the internal shoulder 73 and enlarged portion 78 urges the upper edge of portion 78 against the clip 79. This maintains the entrance of the terminal end 74 about flush with the top surface of jaw 23. The female contact 75 comprises a socket embedded in molded insulating material. The contact 75 is spaced from the entrance of the terminal end 74 by a recess 82. An internal annular groove 83 is formed in the circular wall of the insulating material defining the recess 82. A side opening 84 formed in the tool joint 12 serves to store coiled excess conductor as illustrated in the drawing. The coiled conductor is held in place by cap 85.

The insulated conductor can be installed on a section of drill pipe provided with a pin member 11 and box member 12 at its opposite ends by the following procedure. The terminal ends of a predetermined length of the conductor will be molded in the configuration illustrated in the drawing. Normally the springs 63 and 81 will be placed on intermediate portion of the conductor prior to molding the terminal ends. The overall length of the conductor will be slightly longer than that required to traverse the section of drill pipe. Initially, an intermediate portion of the conductor will be placed in a suitable groove formed in the straight pipe section and cemented in place by the use of an epoxy resin or other adhesive. Terminal end 54 with spring 63 mounted thereon then is threaded through the passage 53 formed in the pin member 11. The terminal end 54 and spring 63 are pulled clear of the passage 53 and a snap ring 86 is snapped onto the terminal end 54 in advance of the compression spring 63. The terminal end 54 then is depressed into the counterbored section 59 until the neck portion 57 thereof registers with the side opening 62. Clip 61 is then inserted through the side opening 62 and snapped onto the neck portion 57. With the terminal end 54 secured, the spring 63 has been compressed between the enlarged portion 58 and snap ring 86 which engages shoulder 60. The opposite end of the conductor is secured to the pin member 11 of the pipe section by the same procedure with a snap ring 87 being employed to hold the spring 81 in place.

With the terminal ends properly mounted in opposite ends of a section of drill pipe, the excess cable at each end is coiled and placed in the excess conductor openings, e.g. openings 66 and 84.

Figure 9:
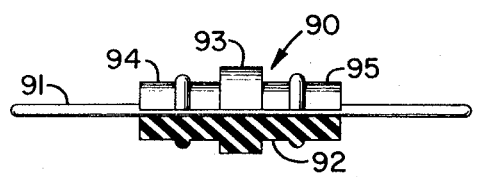
FIG. 9 is a longitudinal view, partially in section, of a plug-type electrical connector useable in the present invention.
Figure 10:
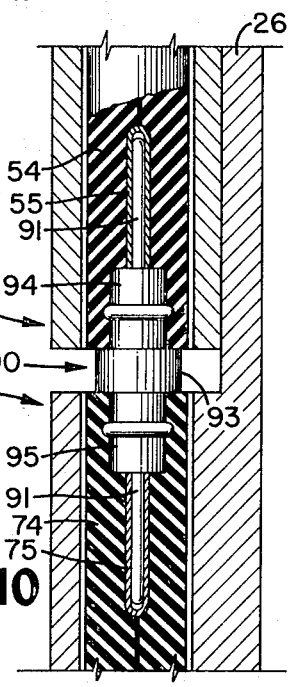
FIG. 10 is an enlarged fragmentary view of a sectional portion of the coupling assembly illustrating the disposition of the electrical connector with the pin member joined to the box member.

When the box member 12 of one section of pipe is properly positioned on the pin member 11 of another section of pipe, the female contact 55 of the former registers with the female contact 75 of the latter. In order to provide electrical connection between the two female contacts, a male electrical connector 90 shown in FIG. 9 is inserted into one of the female connectors prior to joining the pin and box members. The male connector 90 includes a continuous pin contact 91 and a sleeve 92 composed of neoprene or other hard insulating material. The insulating sleeve 92 includes an enlarged portion 93 flanked by ribbed portions 94 and 95 which are sized to snugly fit into recesses 64 and 82 of terminal ends 54 and 74. As shown in FIG. 10, one end of male contact 91 mates with female contact 55 and the opposite end mates with female contact 75 when the jaws 21 and 22 of the box member 12 mesh with the jaws 23 and 24 of pin member 11. The insulating portions 94 and 95 of sleeve 92 project into the recesses 64 and 82 and the ribs thereof snap into the annular internal grooves 65 and 83. The axial dimension of enlarged section 93 is such that the terminal ends 54 and 74 are urged against their respective springs 63 and 81. This provides a positive and water-tight electrical connection. Although the male connector 90 may be formed integrally with one of the terminal ends, it is preferred that it be disconnectable from the assembly to facilitate replacement of worn or damaged contacts.

The pipe sections provided with electrical conductors and connectors as described above may be connected as follows. The male connector 90 is inserted into the female connector of either the box or pin members of the pipe section. In the construction illustrated in FIGS. 1, 2 and 3, the male connector 90 should be inserted in terminal end 54 provided in the box member 12. The pipe sections are then mated by moving the box member 12 of one pipe section rectilineraly onto the pin member 11 of the other section whereupon the exposed male contact 91 penetrates the female contact 75 completing the circuit across the joint. A particularly advantageous feature of the coupling assembly constructed according to the present invention is that the mating of the pin and box members by rectilinear movement permits the use of a plug-type connector. This results in a water-tight, highly reliable connection.

The present invention has been described in connection with a single conductor wire. It will be appreciated, however, that additional conductors can be mounted in each pipe section and that the coupling assembly can be provided with plug-type connectors to electrically connect the conductors of one section to the conductors of the other pipe section. Also, multiple wires may be incorporated in a single conductor cable. In this event, the plug-type connector 90 and companion female connectors will be provided with sufficient number of contacts to accommodate the multiple conductors. In certain operations, however, the drill pipe itself may serve as the ground for the electrical circuit so that only one electrical conductor is required between the surface and the subsurface instrument or tool.

we claim:

1. A coupling assembly for joining a pair of drill pipe sections, each having an insulated electric conductor mounted therein, said coupling assembly comprising a box member connected to one of said pipe sections and having an axially extending gripping jaw formed in a mating end thereof; a pin member connected to the other of said pipe sections and having external threads formed therein and an axially extending gripping jaw formed in a mating end thereof, said gripping jaw of said box member being adapted to mate with the gripping jaw of said pin member as said mating ends are moved rectilinearly into engagement; a collar rotatably mounted on said box member and having internal threads formed therein, said internal threads being adapted to mate with the external threads of said pin member; a female socket contact electrically connected to one of said conductors and mounted in a wall portion of the mating end of one of said members such that said socket contact extends in an axial direction of said one member, and a male pin contact electrically connected to the other of said conductors and mounted in a wall portion of the mating end of the other of said members such that said pin contact extends in an axial direction of said other member, said male and female contacts being adapted to mate as said mating ends of said members are moved rectilinearly into mating relation.

2. A coupling assembly as defined in claim 1 and further comprising clutch means for permitting said collar to be turned in a direction relative to said box member wherein said internal threads formed in said collar mate with said external threads formed on said pin member, but prevents the collar from being turned relative to said box member in the opposite direction, and means for releasing said clutch means wherein said collar is free to turn relative to said box member in either direction.

3. A pipe joint for use in drilling operations which comprises a tubular section; a box member connected to one end of said tubular section and having circumferentially spaced jaws and grooves formed in a mating end thereof; a pin member connected to the other end of said tubular section and having external threads formed thereon and circumferentially spaced jaws and grooves formed in a mating end thereof; a collar rotatably mounted on said box member and having internal threads for mating with the threads of a pin member of an adjacent pipe joint; and an insulated electric conductor extending axially through said tubular section and said box and pin members, said electric conductor including a female socket contact mounted in an end wall portion of one of said mating ends and extending axially with respect to said tubular section, and a male pin contact mounted in an end wall portion of the other mating end and extending axially with respect to said tubular section, said female socket and male pin contacts being adapted to mate with male pin and female socket contacts, respectively, of adjacent pipe joints.

4. A pipe joint as defined in claim 3 and further comprising a one-way clutch mounted in said collar and including a roller adapted to wedge between said collar and said box member, and means for selectively releasing said one-way clutch.

* * * * *